United States Patent
Frayssines et al.

(10) Patent No.: US 9,018,605 B2
(45) Date of Patent: Apr. 28, 2015

(54) NUCLEAR FUSION REACTOR FIRST WALL COMPONENT AND PRODUCTION PROCESS THEREOF

(75) Inventors: Pierre-Eric Frayssines, Fontaine (FR); Philippe Bucci, Engins (FR); Jean-Marc Leibold, Pont de Claix (FR); Emmanuel Rigal, Sassenage (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/234,483

(22) PCT Filed: Jul. 27, 2012

(86) PCT No.: PCT/FR2012/000317
§ 371 (c)(1),
(2), (4) Date: Jan. 23, 2014

(87) PCT Pub. No.: WO2013/017749
PCT Pub. Date: Feb. 7, 2013

(65) Prior Publication Data
US 2014/0191142 A1    Jul. 10, 2014

(30) Foreign Application Priority Data
Aug. 1, 2011 (FR) ..................... 11 02406

(51) Int. Cl.
*G21C 11/02* (2006.01)
*B23K 20/233* (2006.01)
(Continued)

(52) U.S. Cl.
CPC .......... *G21C 11/028* (2013.01); *B23K 20/2333* (2013.01); *B23K 35/004* (2013.01);
(Continued)

(58) Field of Classification Search
CPC ...... B23K 20/021; B23K 20/233; G21B 1/13; B32B 15/20; C22C 32/0021
USPC ......... 250/515.1, 51.1, 505.1, 518.17, 518, 1, 250/517.1; 428/610, 615, 674, 675; 228/193, 194
See application file for complete search history.

(56) References Cited

U.S. PATENT DOCUMENTS 6,164,524 A * 12/2000 Iwadachi ...................... 228/193
(Continued)

FOREIGN PATENT DOCUMENTS

EP    0 856 374 A1    8/1998
(Continued)

OTHER PUBLICATIONS

Kuroda et al; "Development of joining technology for Be/Cu-alloy and Be/SS by HIP;" Journal of Nuclear Materials; 1998; pp. 158-264.
(Continued)

*Primary Examiner* — Jack Berman
*Assistant Examiner* — Wyatt Stoffa
(74) *Attorney, Agent, or Firm* — Oliff PLC

(57) ABSTRACT

A nuclear fusion reactor first wall component includes a copper alloy element, an intermediate metal layer made from niobium and a beryllium element, directly in contact with the intermediate metal layer. The intermediate niobium layer is further advantageously associated with a mechanical stress-reducing layer formed by a metal chosen from copper and nickel. This mechanical stress-reducing layer is in particular arranged between the intermediate niobium layer and the copper alloy element. Furthermore, when the mechanical stress-reducing layer is made from pure copper, a layer of pure nickel can be inserted between the niobium and the pure copper before diffusion welding. Such a component presents the advantage of having an improved thermal fatigue behavior while at the same time preventing the formation of intermetallic compounds at the junction between the beryllium and the copper alloy.

11 Claims, 6 Drawing Sheets

(51) Int. Cl.
*B23K 35/00* (2006.01)
*B23K 35/02* (2006.01)
*G21B 1/13* (2006.01)
*B23K 35/32* (2006.01)
*B23K 20/02* (2006.01)
*B23K 20/16* (2006.01)

(52) U.S. Cl.
CPC ........... *B23K35/007* (2013.01); *B23K 35/0238* (2013.01); *G21B 1/13* (2013.01); *Y02E 30/128* (2013.01); *B23K 35/32* (2013.01); *B23K 20/021* (2013.01); *B23K 20/16* (2013.01)

(56) References Cited

U.S. PATENT DOCUMENTS

| | | | |
|---|---|---|---|
| 6,176,418 B1* | 1/2001 | Iwadachi | 228/193 |
| 6,286,750 B1* | 9/2001 | Iwadachi | 228/118 |
| 6,478,214 B1* | 11/2002 | Rigal et al. | 228/193 |
| 2003/0085260 A1* | 5/2003 | Hatano et al. | 228/194 |
| 2008/0032530 A1* | 2/2008 | Friedrich et al. | 439/145 |

FOREIGN PATENT DOCUMENTS

| | | |
|---|---|---|
| EP | 0 901 869 A1 | 3/1999 |
| EP | 0 934 798 A1 | 8/1999 |
| EP | 1 043 111 A2 | 10/2000 |

OTHER PUBLICATIONS

Jan. 17, 2013 Search Report issued in International Patent Application No. PCT/FR2012/000317 (with translation).

* cited by examiner

NUCLEAR FUSION REACTOR FIRST WALL COMPONENT AND PRODUCTION PROCESS THEREOF

BACKGROUND OF THE INVENTION

The invention relates to a nuclear fusion reactor first wall component provided with a stack successively comprising:
 an element made from copper alloy,
 an intermediate metal layer and
 a beryllium element, directly in contact with the intermediate metal layer.

The invention also relates to a method for manufacturing one such component.

STATE OF THE ART

For nuclear fusion reactors and in particular for the future thermonuclear fusion reactor ITER (International Thermonuclear Experimental Reactor), the vacuum chamber of the reactor is covered by first wall components which are directly facing the plasma. Their role is to protect the personnel working on the site and the nuclear installations surrounding the vacuum chamber of the reactor from the thermal radiation and neutron flux.

FIG. 1 illustrates a schematic diagram of a first wall component 1. It is constituted by an assembly of three different elements:
 an element made from stainless steel 2, in particular of 316LN type
 an element made from copper alloy 3, such as CuCrZr alloy, acting as heat sink
 and a beryllium element 4 designed to be directly facing the thermal radiations and the neutrons emitted by the plasma (arrows F) and acting as a shield.

The materials constituting these three elements are all, with the exception of the beryllium, actively cooled by pressurized water flowing in cooling tubes 5 arranged in stainless steel element 2 and copper alloy element 3.

Assembly of these materials can be performed by several techniques among which the diffusion welding technique assisted by uniaxial pressing or by Hot Isostatic Compression (HIC) can be cited. The latter is in general the most commonly used. Diffusion welding enables the whole of the surfaces in contact to be welded by simultaneous application of a high pressure and a high temperature during a given time. This welding technique is in fact welding in solid state, as the welding temperature is lower than the melting temperature of the materials to be assembled.

Manufacturing of a first wall component for a nuclear fusion reactor therefore conventionally comprises a step of diffusion welding assisted by HIC of stainless steel element 2 with copper alloy element 3 provided with cooling tubes 5. In the case of a CuCrZr alloy, this step is followed by a heat treatment step completed by quenching with water or gas in order to replace in solution the chromium and zirconium precipitates in copper alloy 3 and to obtain a supersaturated solid solution. Finally, the last step consists in assembling beryllium element 4 with copper alloy element 3 by diffusion welding assisted by HIC.

The assembly step between beryllium element 4 and copper alloy element 3 remains a delicate step in the method for producing a first wall component. The junction between the beryllium and the copper alloy (Be/Cu alloy) can in fact present an insufficient mechanical behaviour in the field of application of first wall components for a nuclear fusion reactor for several reasons:

beryllium and copper react with one another above 400° C. to form intermetallic compounds. These intermetallic compounds weaken the junction between the beryllium and the copper alloy and can lead to breaking of the latter when final machining is performed or in premature manner during testing designed to test its mechanical behaviour.
 beryllium has a very thermally stable oxide layer at its surface which can slow down diffusion at the beryllium-copper alloy interface and therefore degrade the quality of the diffused welded assembly.
 beryllium and copper alloy are materials that have different thermal expansion coefficients and Young's modulus, which gives rise to the occurrence of residual fabrication stresses at the interface.

To improve the assembly and mechanical behaviour of the Be/Cu alloy junction, numerous studies propose performing welding by diffusion between these two elements by interposing one or more layers between beryllium element 4 and copper alloy element 3 before assembly. These layers have various functionalities. Certain layers can be compliant layers designed to reduce the mechanical stresses of assembly and possibly to promote bonding between the beryllium and copper alloy. Others can also act as diffusion barriers.

For example purposes, T. Kuroda and al. in the article "Development of joining technology for Be/Cu-alloy and Be/SS by HIP" (Journal of Nuclear Materials 258-263 (1998) 258-264) tested the use of different intermediate layers designed to act as diffusion barrier. Numerous constituents were tested for these intermediate layers. Testing was performed in particular either on metallic monolayers (Al, Ag, OF—Cu or copper devoid of oxygen, BeCu, Ti, Cr, Si, Mo) arranged between beryllium element (Be) and a copper alloy element (DSCu or copper reinforced by an alumina dispersion), or on multilayers formed by successive stacking of monolayers (Ti/Ni, Ti/Ni/Cu, Al/Ti/Cu, Al/Ni/Cu, Al/Mo/Cu and Cr/Cu) arranged between the Be element and the DSCu element. The layers are formed either by deposition, physical vapor deposition or electrolytic deposition, or by using foils of small thickness (50 μm).

With the exception of silver which cannot be used in the nuclear industry as it is activated under neutron bombardment, the other elements used as diffusion barrier generally cause formation of oxides that are very stable in temperature ($Al_2O_3$, $Cr_2O_3$, $SiO_2$, $TiO_2$). Formation of these oxides at the surface of the barrier layers may however limit the diffusion process thereby reducing the mechanical strength of the Be/diffusion barrier/copper alloy assembly.

To prevent formation of these oxides, the barrier layers mentioned above can in general be covered in a vacuum by other metallic layers having a greater affinity with the copper alloy, while at the same time forming oxides that are less resistant in temperature. These layers are in general made from pure copper or from pure nickel. They are for example called bonding promotion layers in U.S. Pat. No. 6,164,524, as they facilitate assembly of the barrier layers mentioned in the foregoing on the copper alloy. In general deposited by physical vapor deposition in the form of metal in pure state, these layers also have the function of being compliant layers (or mechanical stress-reducing layers), as both copper and pure nickel present a low elastic limit and a high ductility. Thus, in addition to enhancing assembly when the diffusion welding operation is performed, they also limit the occurrence of stresses at the Be/copper alloy junction once the latter has been produced by deforming plastically.

In U.S. Pat. No. 6,164,524, it was thus proposed to produce a body assembled by hot isostatic compression with a beryllium element and a copper alloy element by means of a thin layer acting as diffusion barrier. The barrier layer is formed on the beryllium element before the latter is assembled with the copper alloy element by hot isostatic compression, the diffusion barrier layer being arranged between the two elements. The diffusion barrier layer is further formed by a metal such as titanium, chromium, molybdenum or silicon. The thickness of such a layer varies according to the metal used. The assembled body can further also comprise:

a mechanical stress-reducing layer made from aluminum arranged between the diffusion barrier layer and the beryllium element, with a thickness comprised between 5 µm and 2.5 mm.

and/or a bonding promotion layer made from pure copper or pure nickel between the diffusion barrier layer and the copper alloy element, with a thickness comprised between 5 µm and 500 µm.

The assembly method is in addition performed at a temperature comprised between 400° C. and 650° C. and at a pressure comprised between 20 MPa and 300 MPa.

Patent EP0901869 describes a composite material comprising a beryllium layer, a copper alloy layer and a stainless steel layer. An additional layer, for example made from niobium, is inserted between the beryllium layer and the copper alloy layer. The different stainless steel-copper alloy-niobium-beryllium layers are assembled simultaneously by hot pressing.

To know the improvements achieved by the use of these different layers (diffusion barrier, bonding promotion and/or compliant layers), shear tests and corrosion tests or thermal fatigue tests, representative of the stresses of a first wall component of a fusion reactor, were performed in the past on certain assemblies between a Be element and a Cu alloy element.

However, the results of these tests are difficult to use and to compare with one another as, very often, the test models have dimensions and cooling conditions that are not very well known and/or are different. The cooling conditions of a junction subjected to a high-intensity transient heat flux do however greatly influence its thermal fatigue behaviour. It is consequently difficult to appreciate the improvements provided by the assemblies made in the literature compared with a Be/Cu alloy reference junction, with or without a compliant layer for uses as first wall component of a fusion reactor.

Object of the Invention

The object of the invention is to propose and to produce a first wall component suitable for a nuclear fusion reactor, in particular presenting an improved thermal fatigue behaviour compared with a reference junction, while at the same time avoiding the presence of intermetallic compounds and limiting the mechanical stresses of the structure.

This object tends to be achieved by the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED
EMBODIMENTS OF THE INVENTION

It is proposed to produce the junction between the beryllium element and the copper alloy element of a nuclear fusion reactor first wall component by means of an intermediate layer of niobium as diffusion barrier layer. Thus, once assembly has been performed, the junction between the beryllium element and the copper alloy element comprises, in addition to these two elements, an intermediate niobium layer, directly in contact with the beryllium element.

Choosing niobium as the metal to form the intermediate metallic layer designed to be directly in contact with the beryllium element enables a junction to be obtained that has a thermal fatigue resistance suitable for use as a first wall component for a nuclear fusion reactor and more particularly improved compared with a reference junction (Be/$Cu_{pure}$/Cu alloy). Niobium is in fact a metal presenting good weldability capacities with copper. It is furthermore metallurgically compatible with beryllium and copper. It does not form fragile intermetallic compounds, such as the compounds BeCu, $Be_2Cu$, which appear in general when an assembly between a beryllium element and a Cu alloy is made as in the case of the reference junction.

Figure 2:
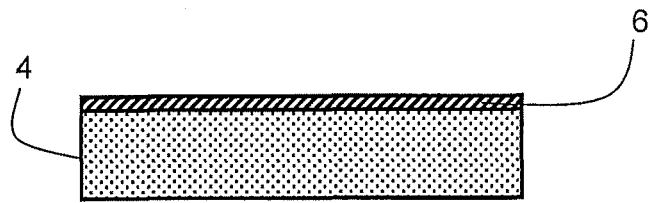
FIGS. 2 to 4 schematically represent in cross-section different steps of production of a nuclear fusion reactor first wall component according to the invention.
Figure 3:
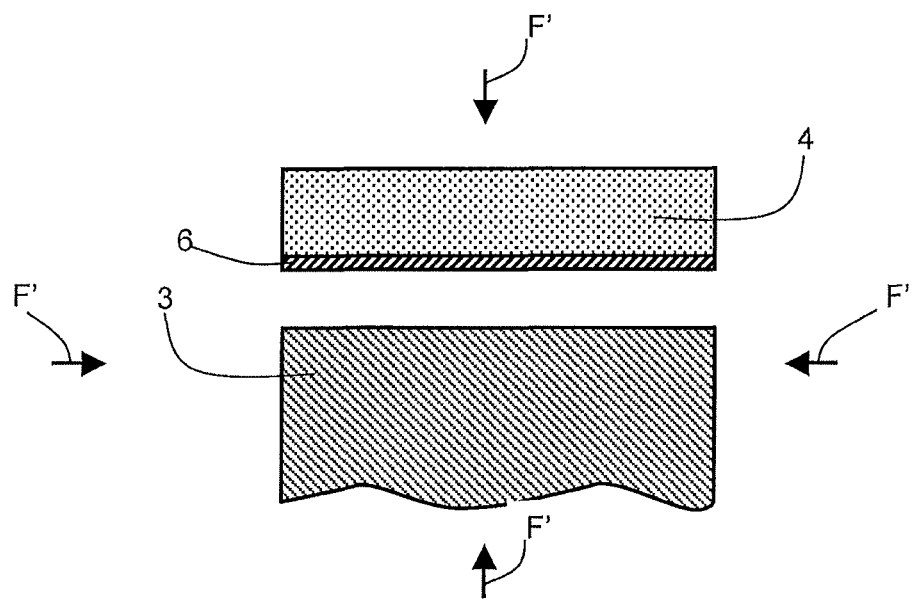
Figure 4:
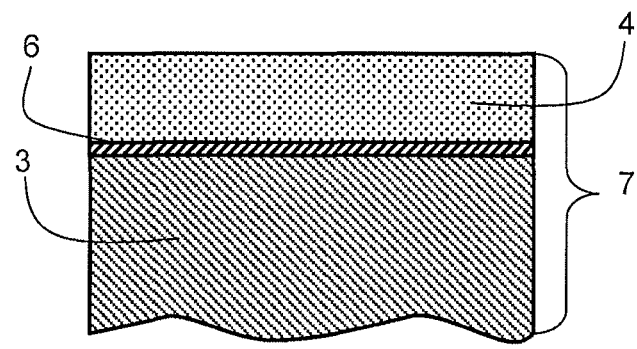

FIGS. 2 to 4 illustrate a first embodiment of a first wall component for a nuclear fusion reactor.

In FIG. 2, intermediate niobium layer 6 is formed directly on a free surface of beryllium element 4 in order to be directly in contact with beryllium element 4. Intermediate niobium layer 6 advantageously presents a thickness comprised between 1 µm and 20 µm and advantageously between 1 µm and 5 µm. This formation step can be performed by any type of means, such as physical vapor deposition (PVD), vacuum evaporation, plasma projection or electrolytic deposition. However, it is preferably performed by PVD. Furthermore, the free surface of beryllium element 4 designed to receive intermediate niobium layer 6 is if necessary cleaned before formation of intermediate niobium layer 6. This can be obtained by a conventional degreasing and de-oxidation operation such as chemical etching, but also by cleaning techniques associated with deposition methods, such as ion bombardment for PVD.

Then, as illustrated in FIG. 3, the stack formed by intermediate niobium layer 6 and beryllium element 4 is placed facing copper alloy element 3, and the two assemblies are then assembled by diffusion welding assisted by hot isostatic compression (symbolized by arrows F' in FIG. 3). The assembly operation by diffusion welding assisted by HIC enables to obtain a stack 7 successively formed by:

copper alloy element 4,
intermediate niobium layer 6,
and copper alloy element 3.

This stack 7 is also noted Be/Nb/Copper alloy and is illustrated in FIG. 4. This first embodiment is particularly advantageous for components of small sizes.

Arranging intermediate metallic niobium layer 6 directly in contact with copper alloy element 3 is particularly advantageous for components of small size.

Nevertheless, in certain cases and in particular for components of larger size, intermediate niobium layer 6 can advantageously be associated with a mechanical stress-reducing layer (or compliant layer) formed by a metal chosen from copper or nickel. What is meant by formed from copper or formed from nickel is that the mechanical stress-reducing layer is made from pure copper or pure nickel, i.e. containing at least 99.95% of copper or nickel. Pure copper is also called Cuc1.

This mechanical stress-reducing layer is in particular arranged between intermediate niobium layer 6 and copper alloy element 3. Its role is to limit the mechanical stresses linked to the assembly between the beryllium element and the copper alloy element. It can also have the function of enhancing bonding, when assembly of the beryllium and copper alloy elements is performed by diffusion welding.

The mechanical and thermal properties of the 3 metals liable to be used to form the mechanical stress-reducing layer are given for illustration purposes in table 1 below:

TABLE 1

| Material | Melting T° (°C.) | Thermal conductivity W/mK (at 20° C.) | Mechanical properties at 20° C. | | |
|---|---|---|---|---|---|
| | | | R0.2 (MPa) | Rm (MPa) | Breaking (%) |
| Cu | 1084 | 397 | 78 | 212 | 56 |
| Ni | 1455 | 88.5 | 60 | 310 | 40 |

For copper and nickel, mechanical stress-reducing layer 8 is in particular placed directly in contact with the copper alloy element.

Figure 5:
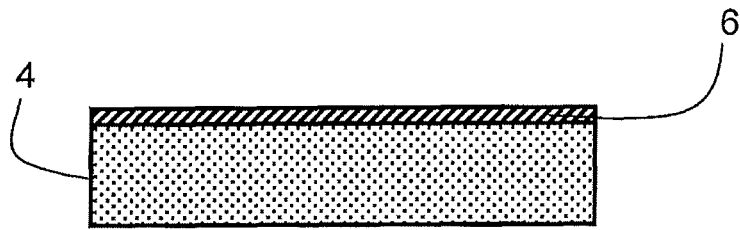
FIGS. 5 to 7 schematically represent in cross-section different steps of production of a second particular embodiment of a nuclear fusion reactor first wall component according to the invention.
Figure 6:
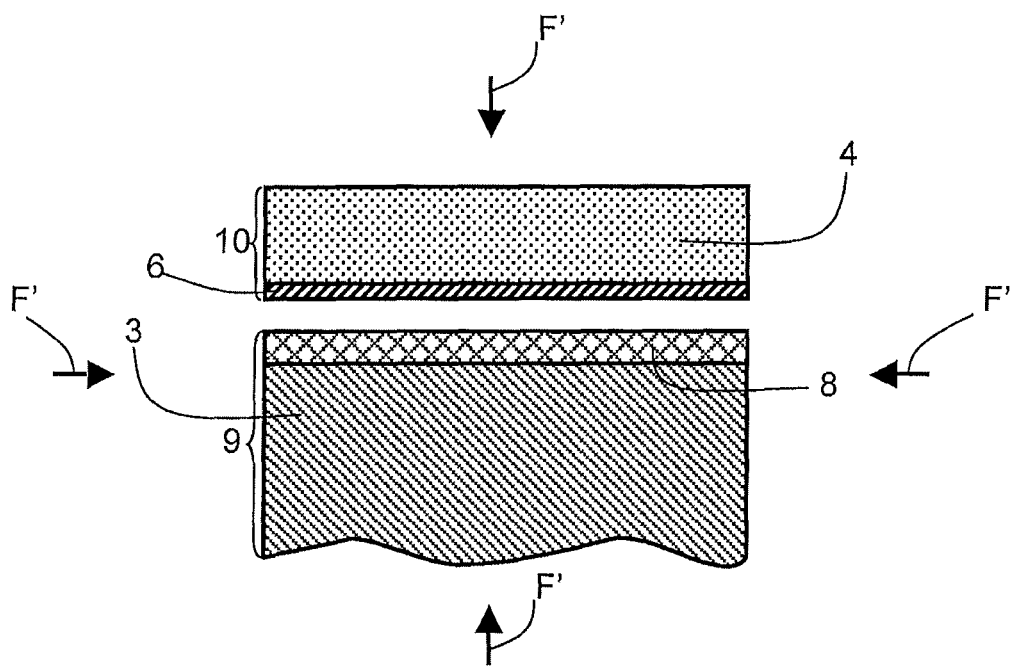
Figure 7:
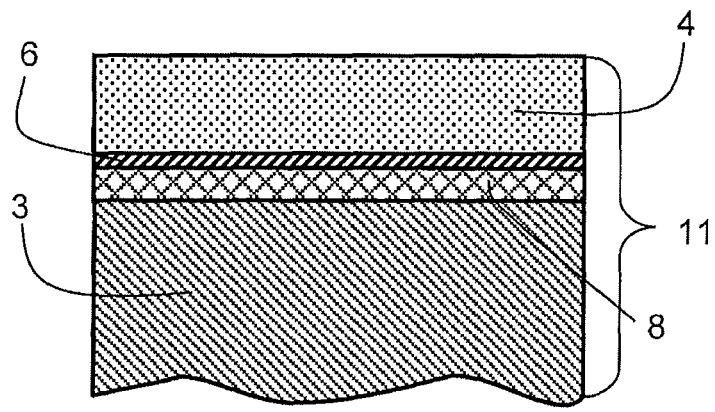

FIGS. 5 to 7 illustrate a second embodiment of a first wall component for a nuclear fusion reactor using a mechanical stress-reducing layer 8.

In FIG. 5, intermediate niobium layer 6 is formed directly on a free surface of beryllium element 4 in order to be directly in contact with beryllium element 4. Intermediate niobium layer 6 advantageously presents a thickness comprised between 1 μm and 20 μm and advantageously between 1 μm and 5 μm. As in the previous embodiment, this formation step can be performed by any type of means. However it is preferably performed by PVD. Furthermore, the free surface of beryllium element 4 designed to receive intermediate niobium layer 6 is if necessary cleaned before formation of intermediate niobium layer 6.

Then, as illustrated in FIG. 6, a mechanical stress-reducing layer 8 (also called compliant layer), for example made from pure copper such as an oxygen-free high-conductivity copper, known under the abbreviation CuC1 or Cu—OF (Oxygen-free high-conductivity), is arranged between intermediate niobium layer 6 and copper alloy element 3.

Placing of mechanical stress-reducing layer 8 can for example be performed by inserting said layer 8 between copper alloy element 3 and beryllium element 4 so that intermediate niobium layer 6 is arranged facing mechanical stress-reducing layer 8.

In particular, in FIG. 6, mechanical stress-reducing layer 8 is placed on copper alloy element 3 and the assembly forms a first stack 9. Second stack 10, formed by intermediate niobium layer 6 and beryllium element 4, is then placed facing first stack 9, and first and second stacks 9 and 10 are then assembled by diffusion welding assisted by hot isostatic compression (symbolized by arrows F' in FIG. 6). In this case, the assembly step enables mechanical stress-reducing layer 8 to be bonded in a single operation not only to copper alloy element 3 but also to intermediate niobium layer 6 of second stack 10.

According to an alternative, mechanical stress-reducing layer 8 could also be directly formed and therefore assembled on copper alloy element 3 before the HIC diffusion welding operation of stacks 9 and 10 is performed. Diffusion welding would then enable intermediate niobium layer 6 to be bonded to mechanical stress-reducing layer 8 which is then already bonded to copper alloy element 3.

In both cases, HIC diffusion welding operation enables a stack 11 to be obtained successively formed by:

beryllium element 4,
intermediate niobium layer 6,
mechanical stress-reducing layer 8,
and copper alloy element 3.

This stack 11 is also noted Be/Nb/$Cu_{pure}$/Copper alloy and is illustrated in FIG. 7.

Figure 8:
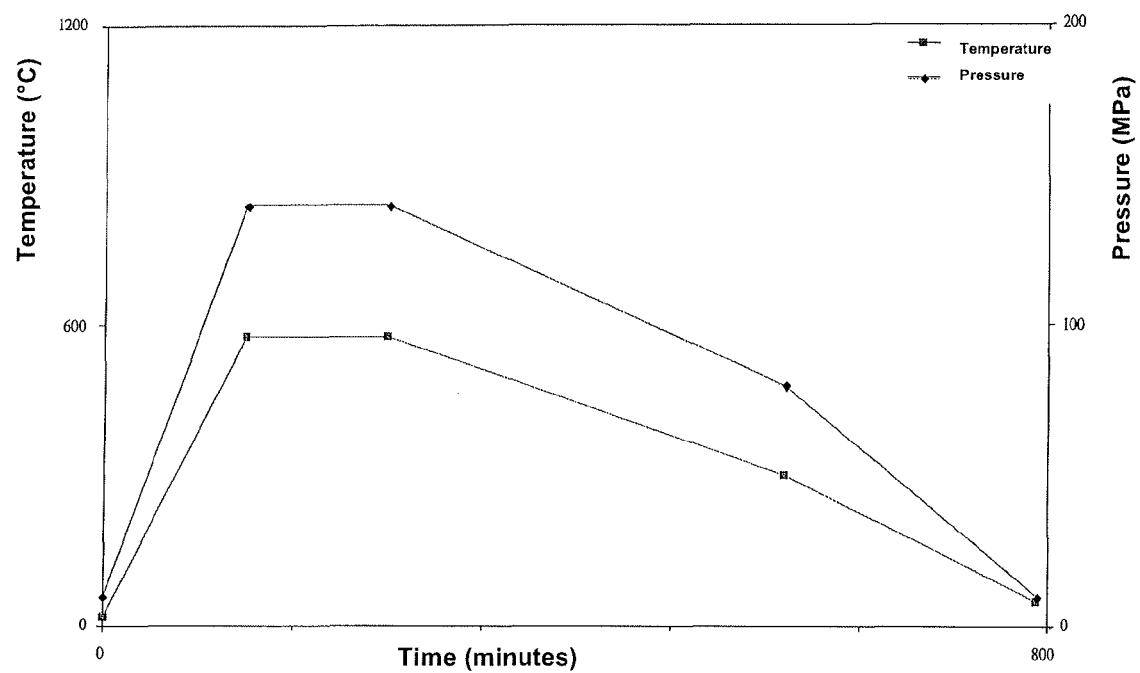
FIG. 8 graphically represents a first example of a diffusion welding cycle assisted by HIC to assemble the beryllium element with the copper alloy element of a component according to the first and second embodiments.
Figure 9:
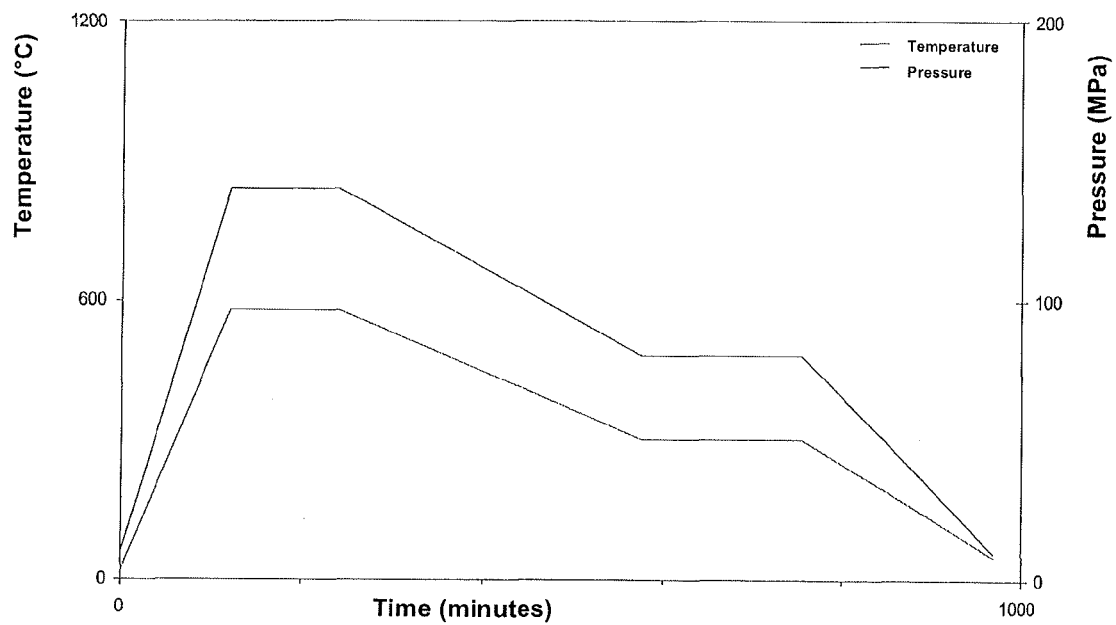
FIG. 9 graphically represents a second example of a diffusion welding cycle assisted by HIC to assemble the beryllium element with the copper alloy element of a component according to the first and second embodiments.

FIGS. 8 and 9 graphically represent two examples of a HIC-assisted diffusion welding cycle able to be used for assembly of beryllium element 4 with copper alloy element 3.

In these two examples of cycles, the temperature and pressure increase rates are identical. They are about 280° C./h and 70 Bar/h in FIGS. 8 and 9, even if they could respectively be different according to the power of the HIC chamber and the size of the component to be manufactured. The diffusion welding plateau occurs in both cases at 580° C. under 140 MPa for 2 hours. The cooling rate, from 580° C. to ambient temperature, is in addition controlled to limit the extent of the residual assembly stresses at the beryllium/copper junction. The latter is conventionally a few tens of ° C./h, but higher rates can be reached without affecting the mechanical strength of the junction. Finally, in FIG. 9, a stress relief plateau is added during the cooling phase to reduce the extent of the mechanical stresses at the junction even further.

The copper alloy forming element 3 is advantageously the CuCrZr alloy, whereas mechanical stress-reducing layer 8 can advantageously be formed by Cu—OF. Mechanical stress-reducing layer 8 can also be made from pure nickel. It furthermore in general has a thickness comprised between a few hundred micrometers and a few millimeters and more particularly between 100 μm and 4000 μm.

Figure 1:
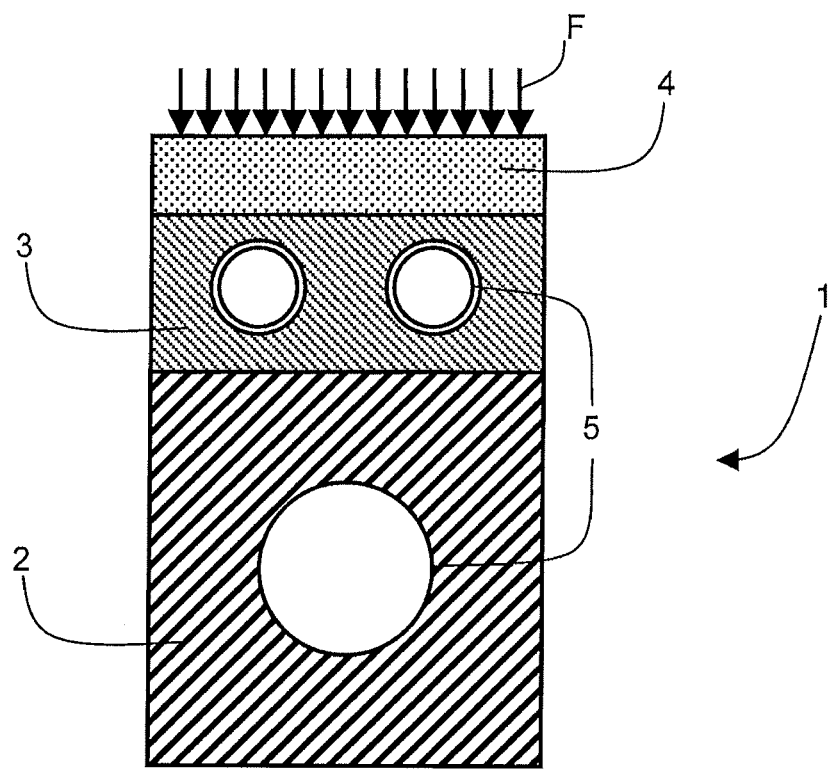
FIG. 1 schematically represents in cross-section a nuclear fusion reactor first wall component according to the prior art.

The first wall component for a nuclear fusion reactor can naturally also comprise an element made from austenitic stainless steel, for example of 316LN type, such as the one represented in FIG. 1, previously assembled with copper alloy element 3 by means of a diffusion welding cycle.

Figure 10:
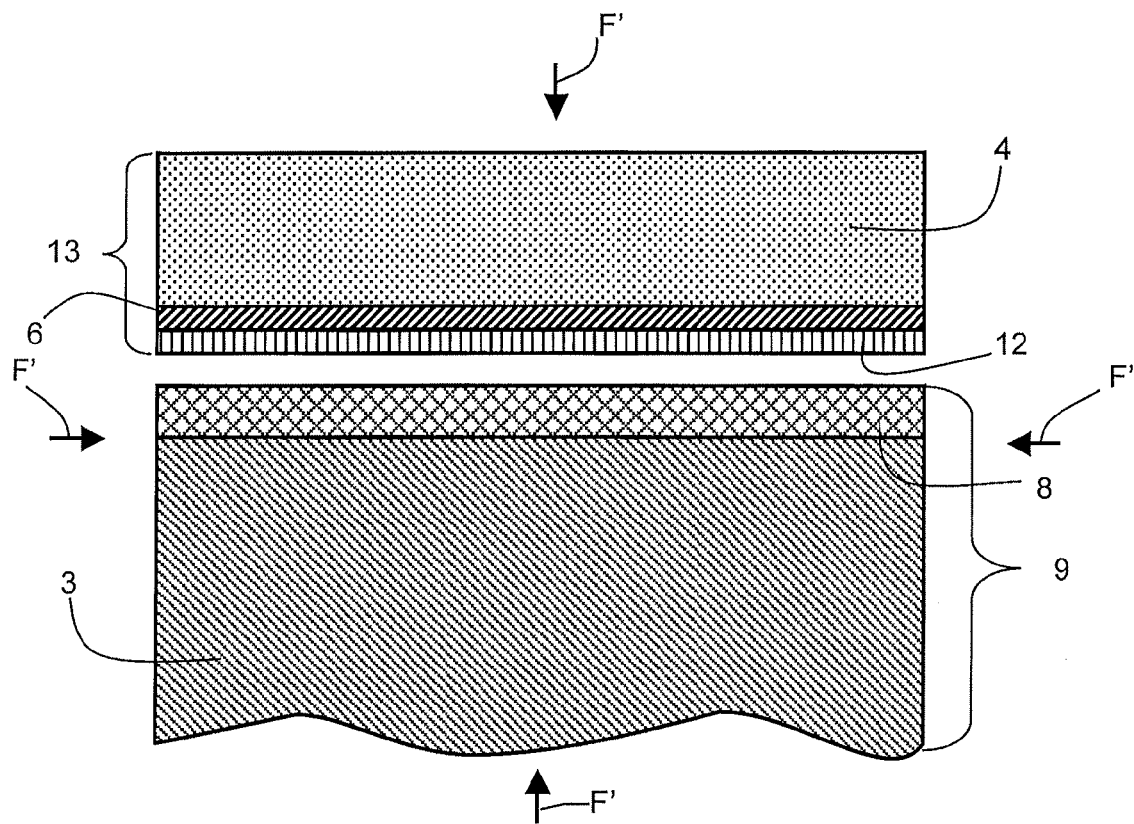
FIGS. 10 and 11 schematically represent in cross-section different steps of production of a third embodiment of a nuclear fusion reactor first wall component according to the invention.
Figure 11:
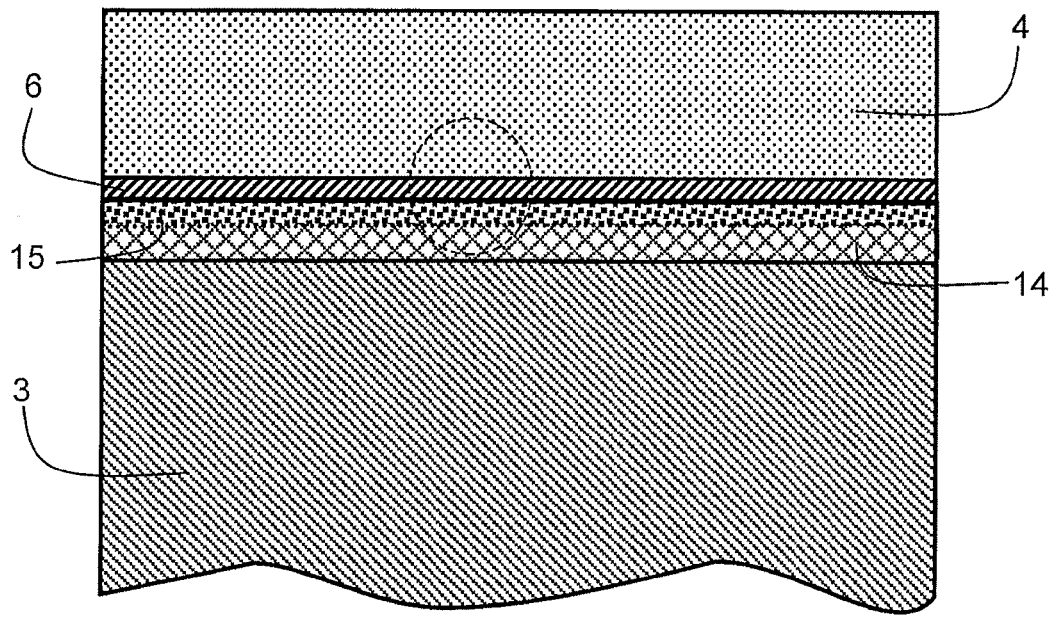

In a third particular embodiment, when mechanical stress-reducing layer 8 is made from pure copper, and as illustrated in FIGS. 10 to 11, it may be advantageous to use a pure nickel layer 12 for performing assembly.

Pure nickel layer 12 is then advantageously formed directly on intermediate niobium layer 6, before the assembly step of beryllium element 4 with copper alloy element 3. Pure nickel layer 12 advantageously presents a thickness comprised between 0.1 μm and 10 μm and advantageously comprised between 0.1 and 5 μm.

Furthermore, as for intermediate niobium layer 6, this formation step of pure nickel layer 12 can be performed by any type of means, such as physical vapour deposition PVD, vacuum evaporation, plasma projection, or electrolytic deposition. It is advantageously performed by PVD. Finally, the free surface of intermediate niobium layer 6 designed to receive pure nickel layer 12 is preferably previously deoxidized.

This embodiment is in particular advantageous when the assembly comprises a compliant layer made from pure copper, as the pure nickel provides protection against oxidation of the niobium surface, before assembly, which enables the presence of oxides at the interface with the copper to be prevented. It also facilitates the HIC-assisted diffusion welding operation between the niobium and copper.

Once pure nickel layer 12 has been formed directly on intermediate niobium layer 6, stack 13 formed by these two layers 12 and 6 and beryllium element 4 is arranged facing stack 9 formed by copper alloy element 3 and mechanical stress-reducing layer 8 made from pure copper. This placing is performed in such a way that pure nickel layer 12 is disposed facing pure copper layer 8. A HIC-assisted diffusion welding operation is then performed to assemble the two stacks 13 and 9 (arrows F' in FIG. 10). This then results in diffusion of the pure nickel in a superficial part of compliant layer of pure copper 8.

As represented in FIG. 11, the HIC-assisted diffusion welding operation then makes it possible to obtain a stack successively formed by:
- beryllium element 4,
- intermediate niobium layer 6,
- an additional intermediate layer 15 made from an alloy of copper and nickel, interposed between intermediate niobium layer 6 and compliant layer of copper 14,
- a stress relaxation (or compliant) layer made from pure copper 14, in direct contact with copper alloy element 3 and copper alloy element 3.

This stack is also noted Be/Nb/CuNi/$Cu_{pure}$/copper alloy.

The compliant layer made from pure copper, noted 14 in FIG. 11, then corresponds to the resulting part of pure copper layer 8 in which the nickel did not diffuse during the HIC-assisted diffusion welding operation. It is in direct contact with copper alloy element 3 and is extended by additional intermediate layer 15 made from an alloy of copper and nickel.

Figure 12:
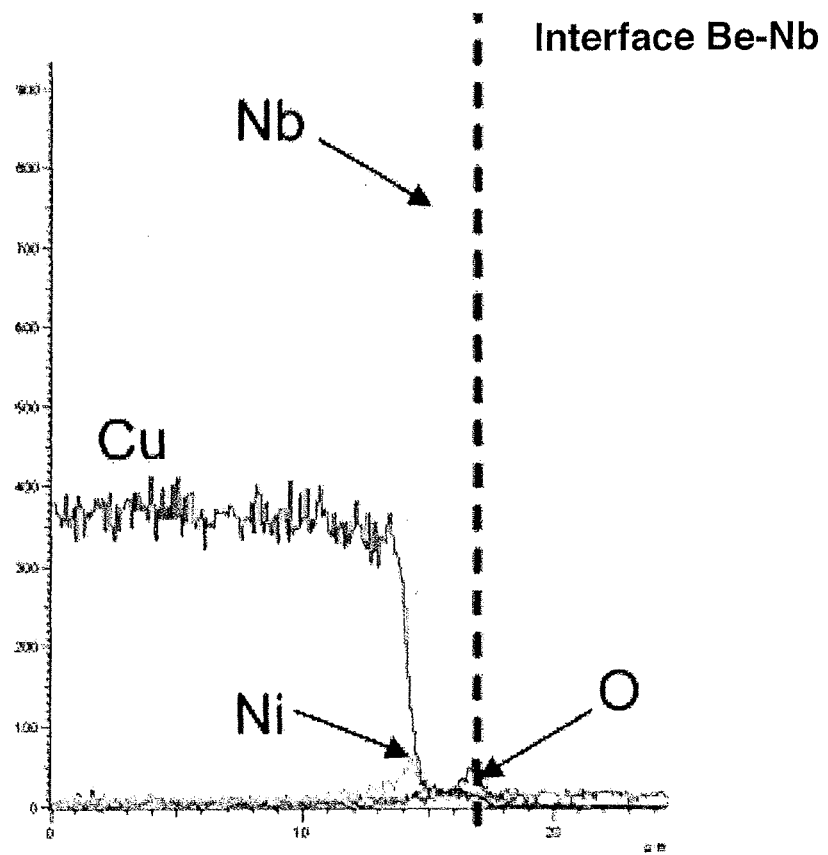
FIG. 12 is a snapshot obtained by Scanning Electron Microscopy (SEM) by energy dispersive X-ray analysis (EDS or EDX) of the junction between the beryllium and the copper for a component produced according to the third embodiment.

Diffusion of nickel in pure copper layer 8 following the HIC-assisted diffusion welding operation was confirmed by observation by scanning electron microscopy of a sample made according to this second embodiment and by EDS analysis as reported in FIG. 12.

Two models A and B, representative of a first wall component, with respectively a Be/Nb/CuNi/$Cu_{pure}$/CuCrZr junction and a Be/$Cu_{pure}$/CuCrZr reference junction, were produced in identical manner and then subjected to thermal fatigue testing.

The models each comprise 9 beryllium tiles having the following dimensions—30.6×27.3×9 mm. For example purposes, a reference model (Be/$Cu_{pure}$/CuCrZr) is illustrated in cross-section in FIG. 13.

The models are more particularly produced in the following manner:

1—diffusion welding of the CuCrZr onto a 316LN stainless steel base. This assembly is performed at high temperature by applying a pressure of 140 MPa for 2 h at a temperature of 1040° C.

2—heat treatment cycle to obtain a supersaturated solid solution of Cr and Zr in the copper matrix. The heat treatment cycle is performed at 980° C. in a vacuum for 1 h. At the end of the temperature gradient, gas quenching at a rate of more than 60° C/min is performed.

3—assembly of the beryllium tiles on the CuCrZr interposing, for the two models, a compliant layer of pure copper of the same thickness between the two materials Be and CuCrZr.

For model A, two layers respectively of niobium and of pure nickel were successively deposited by PVD on the beryllium element, before performing step 3. These layers respectively have thicknesses of about 3 μm and 0.3 μm.

Figure 13:
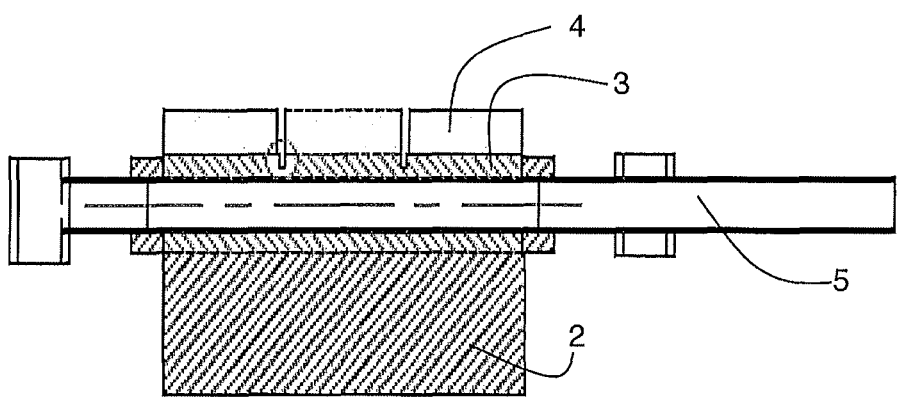
FIG. 13 represents in cross-section a reference model used for thermal cycling tests.

Cooling of these models is performed by pressurized water flow in 4 stainless steel tubes, noted 5 in FIG. 13, having an external diameter of 12 mm and a 1 mm wall and passing through CuCrZr element 3. Water inlet and outlet is performed on the same side of the models and flow of the water in each of tubes 5 is ensured by a water box system placing the tubes in relation 2×2. The water flowrate is 24 l/min (i.e. 5 m/s) and its temperature is the same as the ambient temperature.

These two models A and B are then subjected to the same thermal fatigue testing. This consists in bombarding the beryllium surface of models A and B with a high-energy electron beam. The transient electronic bombardment induces sharp temperature increases and decreases, which enables the materials and junctions to be thermally cycled. During the tests, the duration of the temperature increase and decrease phases are 40s each. The tests begin by high-speed scanning of the surface of the models for power densities increasing from 0.5 to 1.5 MW/m². Then each model undergoes:
- 1000 cycles at 1.5 MW/m²
- then 200 cycles at 2 MW/m²
- then 200 cycles at 2.5 MW/m²
- then 200 cycles at 2.7 MW/m²
- then 200 cycles at 3 MW/m².

The power then increases by 0.2 MW/m² steps every 200 cycles until breaking of the junction between the beryllium and copper takes place.

Table 2 below sets out the successive tests performed on the two models A and B:

TABLE 2

| | Power (MW/m²) | | | | | | |
|---|---|---|---|---|---|---|---|
| | 1.5 | 2 | 2.5 | 2.75 | 3 | 3.2 | 3.4 |
| Number of cycles Model A | 1000 | 200 | 200 | 200 | 200 | 200 | 180 |
| Number of cycles Model B | 1000 | 200 | 200 | 200 | 200 | — | — |

In the course of this testing, it was observed that model A corresponding to the Be/Nb/CuNi/$Cu_{pure}$/CuCrZr junction resisted up to 180 cycles for a power of 3.4 MW/m², whereas model B, corresponding to the Be/$Cu_{pure}$/CuCrZr reference junction, presented signs of breaking at the reference junction after 200 cycles for a power of 2.75 MW/m² and said reference junction yielded after 200 cycles at 3MW/m².

For comparison purposes, complementary tests were performed by producing four new models C, D, E and F. The first three models C to E have an identical structure to model A with the exception of the metal forming the intermediate layer (made from niobium for model A and respectively from Si, Ti and Cr for models C to E. Model F is, like model B, constructed without an intermediate layer (reference model). Assembly of these different models was performed under the same conditions (same HIC and heat treatment cycle) as those of models A and B.

The intermediate layers of Ti, Cr and Si are deposited on the surface of the beryllium by PVD and they each have a thickness (4 µm±1 µm) comparable to the thickness of the intermediate layer of Nb. Each model C to F has a compliant layer made from pure copper of Cu—OF type and having the same thickness as for models A and B. The junctions that underwent thermal fatigue testing are therefore:

Be/Si/Cu—OF/CuCrZr (model C),
Be/Ti/Cu—OF/CuCrZr (model D),
Be/Cr/Cu—OF/CuCrZr (model E),
Be/Cu—OF/CuCrZr (reference model F).

As for models A and B, these 4 models underwent thermal fatigue testing in the same installation using the same cooling conditions (the water flowrate is 24 I/min (i.e. 5 m/s) and its temperature is that of the ambient temperature).

Only the testing conditions differ, as all the tests began at a power density of 2.7 MW/m$^2$ instead of 1.5 MW/m$^2$ as for models A and B. Nevertheless, they can all be compared with the results of an identical reference model (F or B). The results of the thermal fatigue tests are presented in table 3 below.

TABLE 3

| | Power (MW/m$^2$) | | | |
| --- | --- | --- | --- | --- |
| | 2.7 | 3 | 3.2 | 3.4 |
| Number of cycles Model C | — | | | — |
| Number of cycles Model D | 91 | | | — |
| Number of cycles Model E | 1000 | | | 133 |
| Number of cycles Model F | 1000 | | | 100 |

During testing, the model fabricated with the Si intermediate layer (model C) broke during the scanning phase indicating the poor thermal fatigue behaviour of a beryllium-copper junction fabricated with this type of intermediate layer.

The model fabricated with an intermediate layer of Ti (model D) broke after only 91 cycles at 2.7 MW/m$^2$, whereas that fabricated with an intermediate layer of Cr (model E) withstood 1000 cycles at 2.7 MW/m$^2$, and then broke after 133 cycles at 3.4 MW/m$^2$. The latter result is as good as that obtained with a reference model without an intermediate layer (model F), as the latter junction withstood 1000 cycles at 2.7 MW/m$^2$ before breaking after 100 cycles at 3.4 MW/m$^2$. The difference of 33 cycles between model E and model F seems to correspond to the expected experimental dispersion for thermal fatigue tests performed under these conditions.

These results therefore indicate that for models of identical forms cooled in the same manner, the intermediate layers made from Si, Ti and Cr do not provide any significant improvement to the thermal fatigue behaviour compared with a Be/Cu—OF/CuCrZr reference junction. Only the Nb intermediate layer, in particular when it is associated with an additional layer of pure nickel, enables a notable improvement of these properties to be obtained.

The invention claimed is:

1. A nuclear fusion reactor first wall component provided with a stack successively comprising:
    a copper alloy element;
    an intermediate metal layer formed by niobium; and
    a beryllium element, directly in contact with the intermediate metal layer;
    wherein the stack comprises a mechanical stress-reducing layer made from copper and arranged between the intermediate metal layer and the copper alloy element; and
    wherein the stack comprises an additional intermediate layer formed by a nickel and copper alloy and arranged between the intermediate metal layer and the mechanical stress-reducing layer.

2. The component according to claim 1, wherein the mechanical stress-reducing layer is in direct contact with the copper alloy element.

3. The component according to claim 1, wherein the copper alloy is a copper, chromium and zirconium alloy.

4. The component according to claim 1, said component comprising a stainless steel element assembled directly on the copper alloy element.

5. A method for producing a nuclear fusion reactor first wall component according to claim 1, wherein the method comprises the following successive steps:
    formation of the intermediate metal layer on the beryllium element, and
    assembly of the beryllium element provided with the intermediate metal layer with the copper alloy element, by diffusion welding assisted by hot isostatic compression.

6. The method according to claim 5, wherein the assembly step is preceded by a step of placing a mechanical stress-reducing layer made from copper between the intermediate metal layer and the copper alloy element.

7. The method according to claim 6, wherein the mechanical stress-reducing layer being made from copper, a layer of pure nickel is in addition formed on the intermediate metal layer so that the assembly step causes diffusion of the pure nickel in a superficial part of said mechanical stress-reducing layer, the superficial part of the mechanical stress-reducing layer, after the assembly step, forming an additional intermediate layer of copper and nickel alloy, directly in contact with the intermediate metal layer.

8. The method according to claim 7, wherein the layer of pure nickel is formed on the intermediate metal layer by physical vapor deposition.

9. The method according to claim 6, wherein the step of placing the mechanical stress-reducing layer comprises:
    transfer of said mechanical stress-reducing layer onto the copper alloy element, and
    transfer of the beryllium element provided with the intermediate metal layer onto said mechanical stress-reducing layer.

10. The method according to claim 6, wherein the step of placing the mechanical stress-reducing layer comprises:
    formation of said mechanical stress-reducing layer directly on the copper alloy element, and
    transfer of the assembly comprising the beryllium element and the intermediate metal layer onto said mechanical stress-reducing layer.

11. The method according to claim 5, wherein the intermediate metal layer is formed by physical vapor deposition on the beryllium element.

* * * * *